Patented May 24, 1932

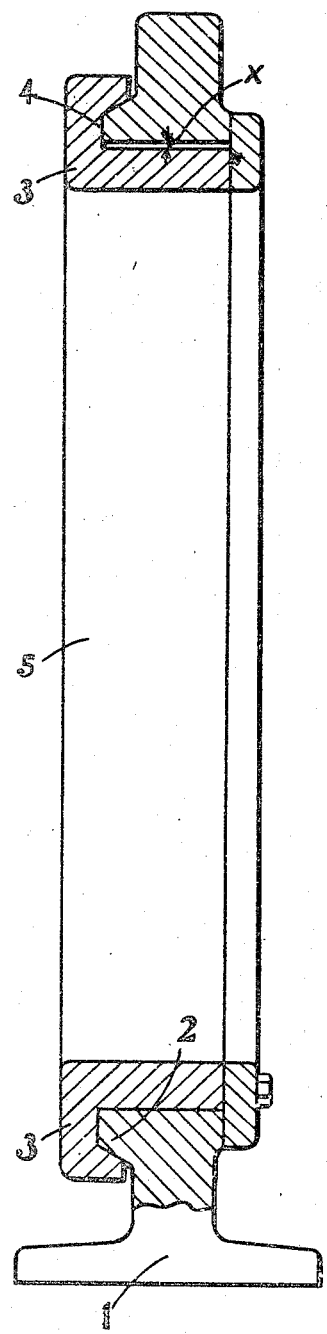
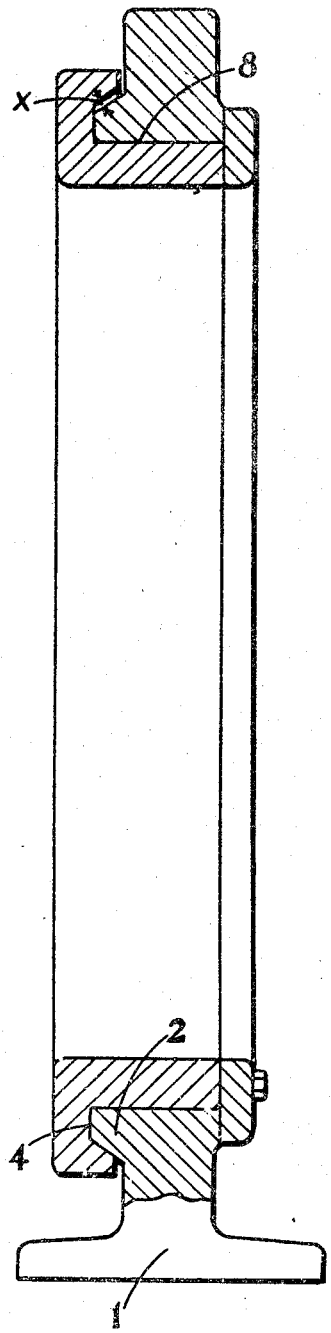
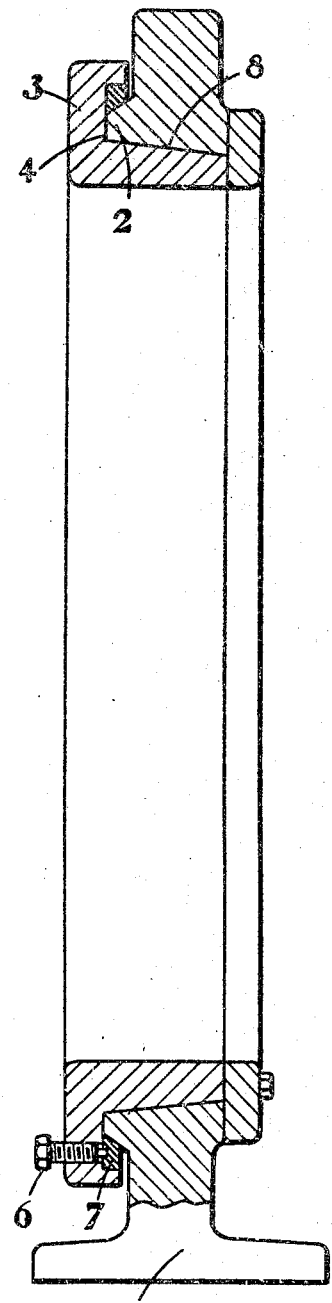

1,859,989

UNITED STATES PATENT OFFICE

AUGUST SCHLEGELMILCH, OF DUSSELDORF, GERMANY, ASSIGNOR TO SCHIESS-DEFRIES AKTIENGESELLSCHAFT, OF DUSSELDORF, GERMANY

TURNING RING BEARING FOR MACHINE TOOLS

Application filed March 13, 1930, Serial No. 435,496, and in Germany March 8, 1929.

In machine tools adapted for turning stationary work, such as crank shafts, in which the tools are supported from tool slides mounted upon slideways carried by an annular rotatable carrier of large diameter, difficulty is involved in the guiding or mounting of the annular carrier, because at high speeds it becomes heated and its diameter thereby increases. This necessitates that the carrier shall have a diameter appreciably smaller at normal temperature than the bore of the bearing in which it rotates. The consequence is that the carrier is not guided accurately centrally, until it has reached a certain temperature. To secure accurate work it is essential that the carrier should be as accurately centered as possible and that under working conditions there should be no undue clearance or play of the carrier in the guide or bearing.

Accuracy of centering sufficient for practical purposes can be secured by setting the work in position relatively to the carrier and carrying out the turning operation after the carrier has acquired the normal working temperature. Control of the degree of play of the carrier in the guide or bearing is not so readily obtained. In order to secure this, various suggestions have been made which, however, have the common disadvantage that the guide or bearing is not adapted to the varying degrees of expansion of the carrier under different conditions of temperature in such a way that the position of the carrier in both the axial direction and the direction normal to the axis remains with a minimum of change. The dovetail guide generally used does not afford this security, as when the carrier expands the guiding faces move apart and thereby permit axial play of the carrier. The axial play which thus necessarily arises in these guides is avoided in U-shaped guides, but in these the position of the carrier in the direction normal to the axis of the carrier is not secured to the degree that is necessary to avoid undesirable movement of the carrier transverse to the axis, which affects the accuracy of the turning operation.

The present invention overcomes these disadvantages and at the same time secures the advantages of these arrangements by providing the carrier with an annular projection which has a guiding surface at right angles to the axis of the carrier, and a second guide surface disposed transversely to the first surface, which projection engages over a correspondingly formed annular projection on the casing of the bearing. This construction gives security of position to the carrier in the axial and transverse directions without the possibility of its being displaced while leaving a certain amount of play. This construction of bearing and guide may also be especially adapted to the particular working conditions by providing between the annular projection on the casing and the annular rib on the carrier which engages over it, a locking ring which can be varied in position axially by means of screws, so that it is possible to adjust the disposition of the carrier and the guide when the machine is constructed and after any wear has taken place. For reasons of convenience it would seem advantageous to make the bearing surface for the carrier conical, so as thereby to render subsequent fitting work on the sliding and running faces unnecessary.

The constructional examples described are illustrated diagrammatically in the accompanying drawings.

Figures 1 and 2 show the construction described in the first instance with the different diameters of the carrier corresponding to low and to high temperature conditions respectively.

Figure 3 shows a second constructional form.

As illustrated in the drawings 5 is the rotatable carrier and 1 the stationary casing or bearing in which the carrier is mounted. The slideways for the tool slides are suitably mounted upon the carrier in such manner that the tool holders may be traversed radially or transversely across the carrier to bring the tool or tools up to the stationary work. The guide casing or bearing 1 has a lateral projection 2, which is engaged by a guide flange 3 which is provided on the carrier 5, and has a guide surface 4 at right angles to the axis of the carrier, and a guide surface disposed transversely with respect to the said surface. The carrier 5 is inserted into the guide casing or bearing 1 with a clearance $x$ which is effective upwardly. Within this clearance, the carrier (see Figures 1 and 2) can expand without affecting the determined disposition in the axial and other direction.

With a considerable rise of temperature of the carrier 5 the relative disposition of the carrier and the guide or bearing 1 becomes that which is represented in Figure 2. Under normal working conditions the temperature does not rise sufficiently to produce expansion of the carrier to the degree represented in Figure 2. Under all conditions, however, the carrier is accurately guided and constrained against axial movement by the guide surface 4 and the corresponding surface on the opposite face of the carrier. There is also no undue freedom of movement of the carrier in the direction transverse to the axis, since, as shown by Figures 1 and 2, the guidance afforded by the lateral projection 2 of the guide or bearing 1 and the co-operating surface of the carrier, in conjunction with that given by the main cylindrical bearing surfaces 8 of the carrier and the guide or bearing, is maintained under all conditions at the lowest part of the carrier under the weight of the carrier.

Figure 3 while retaining in principle the construction shown in Figures 1 and 2, shows a slightly modified form in which between the lateral projection 2 and the flange 3 a locking ring 7, which is adjustable by screws 6, is provided between the casing or bearing 1 and the carrier 5, giving the above-mentioned advantage. In this case the bearing surface 8 is not cylindrical but is made slightly conical.

I claim:

1. The combination with a stationary annular bearing having a lateral annular projection provided with a guiding surface at right angles to the axis of the bearing and a second guiding surface transverse to the first mentioned surface, of an annular tool carrier rotatable within the bearing and having an annular recessed flange fitting over said projection, said flange having annular guiding surfaces adapted to engage the guiding surfaces on said projection.

2. The combination with a stationary annular bearing having a lateral annular projection provided with a guiding surface at right angles to the axis of the bearing and a second guiding surface transverse to the first mentioned surface, of an annular tool carrier rotatable within the bearing and having an annular recessed flange fitting over said projection, said flange having a guiding surface at right angles to its axis adapted to engage the corresponding surface of said projection, and a locking ring adjustably secured within the flange and adapted to engage the transverse guiding surface on said projection.

AUGUST SCHLEGELMILCH.